(12) United States Patent
Ono et al.

(10) Patent No.: US 7,344,605 B2
(45) Date of Patent: Mar. 18, 2008

(54) EXCHANGE SPRING MAGNET POWDER AND A METHOD OF PRODUCING THE SAME

(75) Inventors: Hideaki Ono, Kanagawa-ken (JP); Norihisa Waki, Kanagawa-ken (JP); Munekatsu Shimada, Tokyo (JP)

(73) Assignee: Nissan Motor Co., Ltd., Kanagawa-Ken (JP)

(*) Notice: Subject to any disclaimer, the term of this patent is extended or adjusted under 35 U.S.C. 154(b) by 113 days.

(21) Appl. No.: 11/311,148

(22) Filed: Dec. 20, 2005

(65) Prior Publication Data
US 2006/0096669 A1    May 11, 2006

Related U.S. Application Data

(62) Division of application No. 09/893,892, filed on Jun. 29, 2001, now abandoned.

(30) Foreign Application Priority Data
Jun. 29, 2000    (JP) .......................... P2000-195890

(51) Int. Cl.
*H01F 1/055* (2006.01)
*H01F 1/057* (2006.01)

(52) U.S. Cl. ...................... 148/101; 148/103
(58) Field of Classification Search .............. None
See application file for complete search history.

(56) References Cited

U.S. PATENT DOCUMENTS

| 5,545,266 | A |  | 8/1996 | Hirosawa et al. |
| 6,171,410 | B1 |  | 1/2001 | Kojima et al. |
| 6,172,589 | B1 |  | 1/2001 | Fujita et al. |
| 6,261,385 | B1 |  | 7/2001 | Nomura et al. |
| 6,355,313 | B1 | * | 3/2002 | Yoshimura et al. ......... 427/598 |
| 6,399,150 | B1 | * | 6/2002 | Yoshimura et al. ......... 427/242 |
| 6,423,369 | B1 | * | 7/2002 | Yoshimura et al. ......... 427/127 |
| 2002/0121315 | A1 |  | 9/2002 | Nomura et al. |
| 2002/0144753 | A1 | * | 10/2002 | Yoshimura et al. ......... 148/101 |

FOREIGN PATENT DOCUMENTS

| JP | 6-330252 | 11/1994 |
| JP | 11-186016 | 7/1999 |
| JP | 11-233322 | 8/1999 |
| JP | 2000-3808 A | 1/2000 |

\* cited by examiner

*Primary Examiner*—John P. Sheehan
(74) *Attorney, Agent, or Firm*—McDermott Will & Emery LLP

(57) ABSTRACT

An anisotropic exchange spring magnet powder complexing a hard magnetic material and a soft magnetic material, wherein a rare earth metal element, a transition metal element, boron and carbon and the like are contained, and the hard magnetic material and soft magnetic material have crystal particle diameters of 150 nm or less. A method of producing an anisotropic exchange spring magnet powder comprises treating a crystalline mother material containing a hard magnetic material and soft magnetic material or the crystalline mother material having amorphous parts, in a continuous process composed of an amorphising process and the following crystallizing process, repeated once or more times. An anisotropic exchange spring magnet is obtained by treatment, in an anisotropy-imparting molding process and a solidification process, of an anisotropic exchange spring magnet powder.

8 Claims, 14 Drawing Sheets

RELATION BETWEEN CONTENT X
AND MAXIMUM ENERGY PRODUCT
(COMPOSITION OF MAGNET MATERIALS: $Nd_4Fe_{88-X}Co_5Nb_3B_X$)

RELATION BETWEEN NUMBER OF CYCLES AND RELATIVE VALUE OF COERCIVE FORCE (COMPOSITION OF MAGNET MATERIALS: $Nd_9Fe_{75}Co_8V_2B_6$)

STRUCTURE OF DRIVING MOTOR

FIG. 14

| No. | PRESENCE OR ABSENCE OF ANISOTROPY | MAIN PERMANENT MAGNET MATERIALS | MAIN SOFT MAGNETIC MATERIALS |
|---|---|---|---|
| 1 | PRESENT | Nd-Fe-B-BASED MATERIALS | Fe, Fe-B, Fe-C, Fe-Co |
| 2 | PRESENT | Sm-Fe-N-BASED MATERIALS | Fe, Fe-N, Fe-Co |
| 3 | PRESENT | Sm-Fe-N-B-BASED MATERIALS | Fe, Fe-N, Fe-B, Fe-Co |
| 4 | PRESENT | Nd-Fe-B-BASED MATERIALS TbCu7 type | Fe, Fe-B, Fe-Co |
| 5 | PRESENT | Sm-Fe-N-BASED MATERIALS TbCu7 type | Fe, Fe-N, Fe-Co |
| 6 | PRESENT | Sm-Co-BASED MATERIALS | Fe, Fe-Co, Co |
| 7 | PRESENT | Sm-Co-B-BASED MATERIALS | Fe, Fe-B, Fe-Co, Co |
| 8 | PRESENT | Ba $Fe_{12}O_{19}$ BASED MATERIALS<br>Sr $Fe_{12}O_{19}$ BASED MATERIALS | Mn-Zn-BASED FERRITE<br>Ni-Zn-BASED FERRITE<br>$Fe_3O_4$-BASED FERRITE |

EXCHANGE SPRING MAGNET POWDER AND A METHOD OF PRODUCING THE SAME

This application is a divisional of Application 09/893,892, filed Jun. 29, 2001, now abandoned which claims priority of Japanese Application No. 2000-195890, filed Jun. 29, 2000, the contents of which are hereby incorporated by reference.

BACKGROUND OF THE INVENTION

The present invention relates to an exchange spring magnet powder and a method of producing the same, more particularly, to an exchange spring magnet powder realizing an exchange spring magnet having anisotropy, which can suitably used in motors, magnetic field sensors, rotation sensors, acceleration sensors, torque sensors and the like, and a method of producing the same.

As related permanent magnet materials, ferrite magnets which are chemically stable and inexpensive and rare earth metal-based magnets having high ability are practically used. These magnets are constituted of approximately a single compound as a magnet compound, and recently, exchange spring magnets are noticed which are obtained by complexing a permanent magnet material having high coercive force with a soft magnetic material having high magnetic flux density.

Such exchange spring magnets are expected to have high maximum energy product, and theoretically, extremely high magnetic property of 100 MGOe($\approx$796 kJ/m$^3$) or more can be realized.

SUMMARY OF THE INVENTION

However, exchange spring magnets developed to date have isotropy, and the resulting maximum energy product is as low as about 20 MGOe($\approx$159 kJ/m$^3$). The maximum reason for this is that orientations of crystal particles constituting an exchange spring magnet are not arranged to a constant direction, therefore, there are a lot of studies to realize an anisotropic exchange spring magnet which is so fine and has crystal directions arranged toward the same direction as to manifest exchange connection.

The present invention has been accomplished in view of such problems of earlier technologies, and an object of the present invention is to provide an anisotropic exchange spring magnetic powder which can realize an exchange spring magnet having more excellent anisotropy and higher maximum energy product as compared with conventional magnets, and a method of producing the same, and an anisotropic exchange spring magnet obtained by using this magnetic powder.

The present inventors have intensively investigated to attain the above-mentioned object, and resultantly, found that the above-mentioned object can be accomplished by treating a given crystalline mother material in specific amorphising process and crystallizing process, leading to completion of the present invention.

Namely, the anisotropic exchange spring magnet powder of the present invention comprises a hard magnetic material phase containing a rare earth metal element, a transition metal element, and at least one element selected from the group consisting of boron (B), carbon (C), nitrogen (N) and oxygen (O), and a soft magnetic material phase containing a transition metal element, and at least one element selected from the group consisting of boron (B), carbon (C), nitrogen (N) and oxygen (O), wherein the above-mentioned hard magnetic material phase and soft magnetic material phase have crystal particle diameters of 150 nm or less.

The method of producing an anisotropic exchange spring magnet powder of the present invention comprises: preparing a crystalline mother material containing a hard magnetic material phase containing a rare earth metal element, a transition metal element, and at least one element selected from the group consisting of boron (B), carbon (C), nitrogen (N) and oxygen (O), and/or, the crystalline mother material partially having amorphous parts: amorphising the above-mentioned crystalline mother material, and re-crystallizing the above-mentioned amorphisated mother material.

According to the present invention, an anisotropic exchange spring magnet powder having a fine crystal particle diameter and crystal orientations arranged to the constant direction is obtained.

When the production method of the present invention is effected, an anisotropic exchange spring magnet powder can be obtained which is finer and more excellent in magnetic property by repeating a continuous process composed of an amorphising process and a crystallizing process.

Further, the anisotropic exchange spring magnet of the present invention is obtained by treatment, in an anisotropy-imparting molding process and a solidification process, of an anisotropic exchange spring magnet powder comprising a hard magnetic material phase containing a rare earth metal element, a transition metal element, and at least one element selected from the group consisting of boron (B), carbon (C), nitrogen (N) and oxygen (O), and a soft magnetic material phase containing a transition metal element, and at least one element selected from the group consisting of boron (B), carbon (C), nitrogen (N) and oxygen (O), wherein the above-mentioned hard magnetic material phase and soft magnetic material phase have crystal particle diameters of 150 nm or less.

According to the present invention, an anisotropic exchange spring magnet powder having a fine crystal particle diameter and crystal orientations arranged to the constant direction is obtained.

BRIEF DESCRIPTION OF THE DRAWINGS

FIG. 14 is a table showing combinations of permanent magnetic materials and soft magnetic materials in FIG. 2, and presence or absence of anisotropy.

DETAILED DESCRIPTION OF THE PREFERRED EMBODIMENTS

Figure 1:
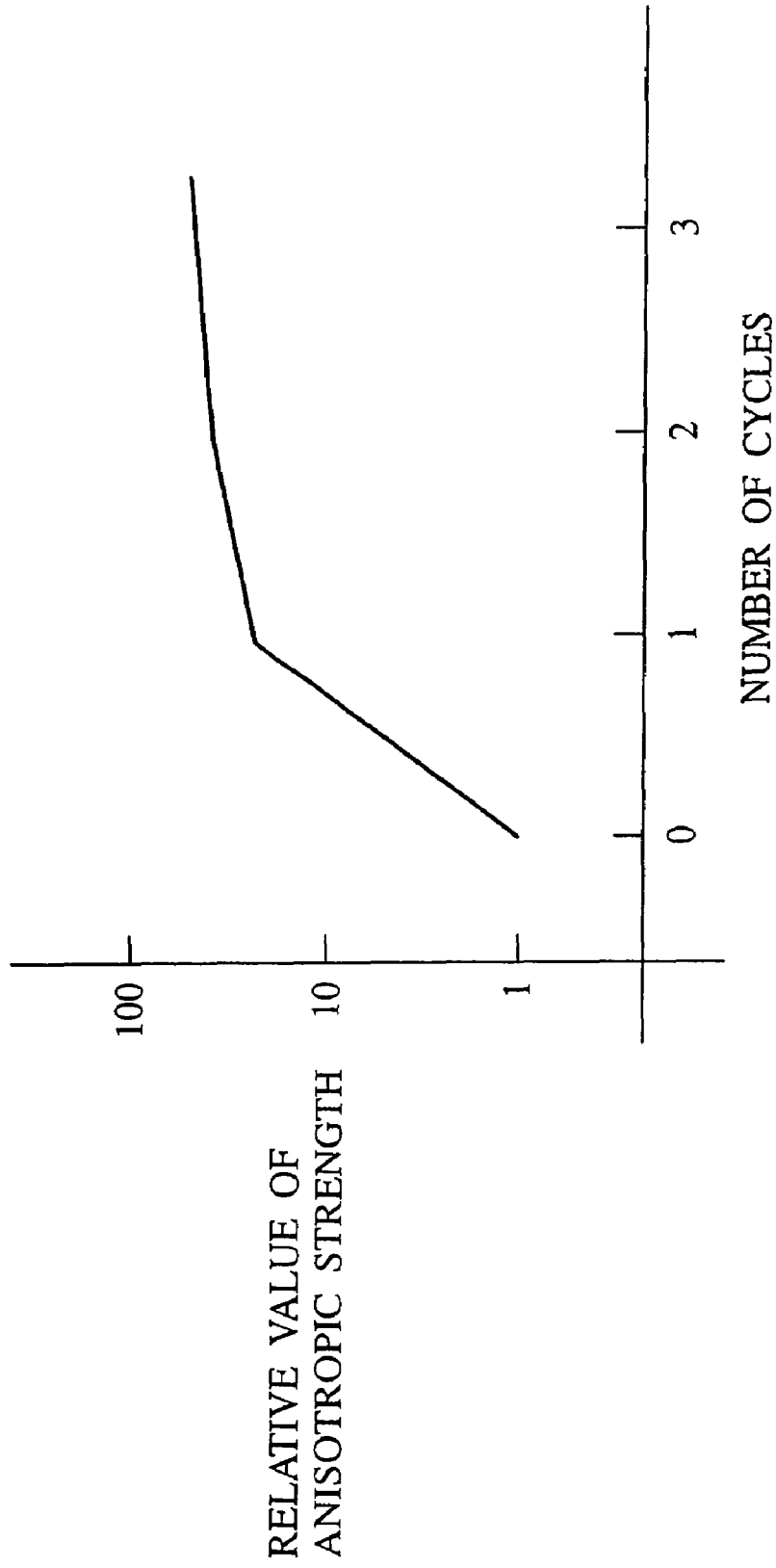
FIG. 1 is a graph showing a relation between the number of process cycles and the relative value of anisotropic strength in the first embodiment.

The exchange spring magnetic powder of the present invention will be illustrated in detail below. In the present specification, "%" is by weight unless otherwise stated.

As described above, the exchange spring magnetic powder of the present invention is an exchange spring magnetic powder excellent in anisotropy obtained by complexing a permanent magnetic material with a soft magnetic material. Hereinafter, according to conventional manners, a permanent magnetic material is called a hard magnetic material phase and a soft magnetic material is called a soft magnetic material phase.

As element components, a rare earth metal element, a transition metal element, and boron (B), carbon (C), nitrogen (N) or oxygen (O) or any mixtures thereof are contained, and a hard magnetic material phase and a soft magnetic material phase have crystal particle diameters of 150 nm or less.

Here, as the hard magnetic material phase, Nd—Fe—B-based, Sm—Fe—N-based, Sm—Fe—N-B-based, Sm—Co-based, Sm—Co—B-based, $BaFe_{12}O_{19}$-based and $SrFe_{12}O_{19}$-based materials, and the like are listed, and as the soft magnetic material phase, Fe, Co, Fe—B-based, Fe—C-based, Fe—Co-based and Fe—N-based materials, and Mn(manganese)-Zn(zinc)-based ferrite, Ni(nickel)-Zn-based ferrite and $Fe_3O_4$-based ferrite, and the like are listed.

In the exchange spring magnetic powder of the present invention, a hard magnetic material phase and a soft magnetic material phase, as described above, are complexed, in other words, in this magnetic powder, a hard magnetic material phase and a soft magnetic material phase are present in admixture under the condition of exchange connection of magnetization of a hard magnetic material phase and magnetization of an adjacent soft magnetic material phase.

The exchange spring magnetic powder of the present invention manifests high anisotropy, and typically, has anisotropic strength represented by the following formula:

$$Br_{//}/Br_{\perp}=10 \text{ to } 30$$

(wherein, $Br_{//}$ represents residual magnetic flux density along magnetic field application direction in molding in magnetic field, and $Br_{//}$ represents residual magnetic flux density along vertical direction to this magnetic field application direction).

On the other hand, as described above, the exchange spring magnetic powder of the present invention contains a rare earth metal element, a transition metal element, and B, C, N or O or any combinations thereof, and contains, as essential components, a rare earth metal element, a transition metal element, and an element such as B, C and the like, from the standpoint of element components.

In this case, the rare earth metal element is not particularly restricted, and Nd, Pr or Sm and any combinations thereof are suitable, and also the transition metal element is not particularly restricted, and it is preferable to use Fe and/or Co as the main component. As the transition metal element, other transition metal elements such as vanadium (V), niobium (Nb), chromium (Cr), nickel (Ni), aluminum (Al), titanium (Ti), gallium (Ga), zirconium (Zr) and the like can also be used.

Further, in the exchange spring magnetic powder of the present invention, the content of the above-mentioned rare earth metal element and an element such as B, C or the like is not particularly restricted providing the above-mentioned property is manifested, and typically, it is preferable that the content of rare earth metal element is from 2 to 15 atomic %, the content of elements such as B, C and the like is from 1 to 25 atomic % or less.

When the content of rare earth metal element is less than 2 atomic %, the content of a hard magnetic material phase in a magnet produced thereafter lowers, while when over 15 atomic %, the content of a soft magnetic material phase lowers, namely, in any case, magnetic ability may decrease.

On the other hand, when the content of elements such as B, C and the like is out of the above-described range, disadvantages occur such as production of compounds not preferable for the intended magnetic material in the present invention, deviation of a formulation ratio of compounds in a magnetic material out of the preferable range, and the like, and resultantly, the ability of the magnetic material may decrease. Regarding the transition metal elements, the content is preferably from 70 to 85 atomic %.

Further, in the exchange spring magnetic powder of the present invention, the crystal particle diameter of the above-mentioned hard magnetic material phase and soft magnetic material phase is controlled to 150 nm or less, and by this, this magnetic powder shows excellent change connection property.

When the particle diameter is over 150 nm, the center part of a soft magnetic material phase is not easily affected by a hard magnetic material phase, consequently, excellent magnetic property, namely high maximum energy product may not be obtained, and the intended magnetic material in the present invention is not obtained.

Next, the method of producing an exchange spring magnetic powder of the present invention will be explained in detail.

The method of producing an exchange spring magnetic powder of the present invention is a method for obtaining an exchange spring powder as described above, and in this method, a crystalline mother material containing the above-mentioned hard magnetic material phase and soft magnetic material phase, a material obtained by forming amorphous parts partially in this crystalline mother material, or a mixture of them, is subjected continuously to amorphising treatment and crystallizing treatment each at least once.

Here, the above-mentioned crystalline mother material is a crystalline magnetic material containing a hard magnetic material phase and a soft magnetic material phase as described above, and element components thereof are also as described above, and a large difference from the exchange spring magnetic powder of the present invention is presence or absence of exchange of magnetization of a hard magnetic material phase and magnetization of an adjacent soft magnetic material phase.

In the production method of the present invention, introduction of amorphous parts into such a crystalline mother material can be conducted by known technologies, f or example, a high frequency introduction melting and casting method, liquid quenching method, atomizing method and the like.

A benefit of thus introducing amorphous parts partially into a crystalline mother material previously is that oxidation of the mother material can be suppressed sufficiently since the following amorphising process can be simplified and shortened, and by this means, the magnetic property of the resulting exchange spring magnetic powder can be further improved.

The content of amorphous parts in the mother material can be evaluated from the temperature dependence of magnetization, and it is desirably 95% or less. When the content of amorphous parts is over this range, the degree of orientation of the mother material crystal may lower to decrease magnetic property.

The above-mentioned amorphising process ran be conducted by applying a ball mill method, plasma irradiation method and the like, and by this process, a crystalline mother material and/or a material obtained by introducing amorphous parts into this crystalline mother material is amorphisated into a condition in which fine crystal particles remain in an amorphous matrix.

In the production method of the present invention, a crystallizing process by heat treatment is conducted following this amorphising process. By this process, crystal particles in the above-mentioned amorphous matrix are crystallized so finely as to cause exchange connection of the particles, and in this procedure, crystals grow continuously toward the direction of fine crystal particles remaining, resultantly, in one crystal particle, an anisotropic exchange spring magnet powder which is fine and has crystal particle diameters of approximately the same size is formed.

In the production method of the present invention, the above-mentioned amorphising process and/or crystallizing process is desirably conducted under a condition in which oxygen is blocked, for example, in vacuum, in an inert gas, in nitrogen or in an organic solvent. By conducting the process under such a condition, deterioration of a rare earth metal-based magnetic compound can be prevented, and decrease in magnetic property of the resulting exchange spring magnetic powder can be prevented.

Further, in the production method of the present invention, it is desirable to repeat the above-mentioned amorphising process and crystallizing process (continuous process of amorphisation-crystallization) once or more times. In details, in the second time procedure, the crystallized matrix partly changes into amorphous parts by mechanical energy generated by the ball mill method. By this, the degree of orientation of crystal is further improved, and consequently, an anisotropy-imparting effect increases, which is effective for improvement of magnetic property.

In the above-mentioned crystallizing process, it is sufficient that crystallization realizing the above-mentioned exchange connection can be conducted, and typically, it is preferable that the temperature of heat treatment for crystallization is 950° C. or less. When over 950° C., an anisotropic exchange spring magnet powder having fine crystal particles may not be obtained, and deterioration in magnetic property occurs, therefore, the crystallization is desirably conducted at 950° C. or less, and due to the same reason, the time of heating treatment for crystallization is desirably 1 hour or less.

In the production method of the present invention, it is also possible to conduct this crystallizing process under compression, and by this, crystal growth can be promoted.

As the compressing method, for example, hot press and spark plasma sintering methods can be applied, and it is desirable to conduct compression at a pressure from 49 to 98 MPa (0.5 to 1.0 ton/cm$^2$) in the case of the hot press method, and at a pressure from 490 to 980 MPa (5 to 10 ton/cm$^2$) in the case of the spark plasma sintering method.

Further, in such a crystallizing process by heat treatment, it may also be permissible that anisotropy is imparted to a magnetic material amorphousated in the previous process, then, the material is molded while being solidified, and the molded particle is crystallized, and by this, the degree of orientation of crystal can be further enhanced and magnetic property can be further improved.

As such a method of imparting anisotropy, there is, for example, a method in which compression-molding is conducted under a condition in which crystallization directions are arranged to the constant direction in magnetic field. Regarding treatment conditions in this procedure, it is desirable that the magnetic strength is 20 kOe($\approx$1592 kA/m) or more, the compression pressure is from 98 to 294 MPa (1 to 3 ton/cm$^2$), and the treatment temperature is ordinary temperature.

Next, the anisotropic exchange spring magnet of the present invention will be explained in detail.

The anisotropic exchange spring magnet of the present invention is obtained by using the above-mentioned anisotropic exchange spring magnet powder of the present invention, and obtained by treatment of this magnetic powder in an anisotropy-imparting molding process and a solidification process.

As the solidification process in this procedure, hot press and spark plasma sintering methods which can effect full densifying at constant temperature, and the like are effective.

Further, though the anisotropic exchange spring magnet of the present invention is obtained typically as an anisotropic exchange spring magnet of bulk type, since this spring magnet shows higher maximum energy product as compared with known resins and metal bonded magnets having low melting point or full dense magnets, of the same form, when this spring magnet is applied to motors, magnetic field sensors, rotation sensors, acceleration sensors, torque sensors and the like, production of smaller and lighter products is promoted, and in the case of application to automobile parts for example, remarkable improvement in fuel consumption can be attained.

Further, since such a bulk magnet has extremely high maximum energy product, by application of this magnet particularly to a driving motor in electric automobiles and hybrid electric automobiles, among magnetic field sensors, rotation sensors, acceleration sensors and torque sensors, the driving motor can be installed at a place in which space can not be secured easily conventionally, and environmental problems can be solved at one time.

The following embodiments and comparative examples will illustrate the present invention further in detail below, but do not limit the scope of the present invention.

First Embodiment

A crystalline mother material containing amorphous parts was produced according to a liquid quenching method using an alloy of the formula: $Nd_4Fe_{88-x}Co_5Nb_3B_x$, which had been high frequency induction-fused. Then, this crystalline mother material was ground into a coarse powder of 1 mm or less which was amorphised by a plasma irradiation method, then, crystallizing treatment was conducted for given cycles to obtain an anisotropic exchange spring magnet powder of this embodiment. In this magnetic powder, a hard magnetic material phase: $Nd2Fe_{14}B$ had a crystal particle diameter of about 40 nm, and a soft magnetic material phase: $Fe_3B$ had a crystal particle diameter of about 40 nm.

In this plasma irradiation method, the above-mentioned coarse powder was exposed in high frequency Argon (Ar) plasma, and this coarse powder was amorphised from the surface direction by plasma energy.

The resulted exchange spring magnetic powder was ground into a powder of 100 μm or less, then, press-molded in a magnetic field of 25 kOe(≈1990 kA/m) to produce a compressed powder body, and magnetization curves along magnetic field application direction and vertical direction to this of the powder body were measured by a direct current BH tracer manifesting a maximum field of 25 kOe(≈1990 kA/m), and presence or absence of anisotropy was confirmed by a difference between these curves.

FIG. 1 shows the cycle number of amorphism and crystallization and the relative value of the anisotropic strength (ratio of residual magnetic flux density $Br_{//}$ along magnetic field application direction in molding in magnetic field to residual magnetic flux density $Br_{\perp}$ along vertical direction to this), when using a mother material having a composition of the above-mentioned alloy in which x=19 and an amorphous content evaluated by temperature property of magnetization of 80%, the crystallizing process being heat treatment in vacuum at 650° C. for 10 minutes.

FIG. 1 shows that the effect of the process of the present invention is extremely high, and anisotropy can be imparted by conducting amorphism and crystallization each once. Further, there is also shown a tendency of increase in extent of anisotropy by repetition of once or more times.

Figure 2:
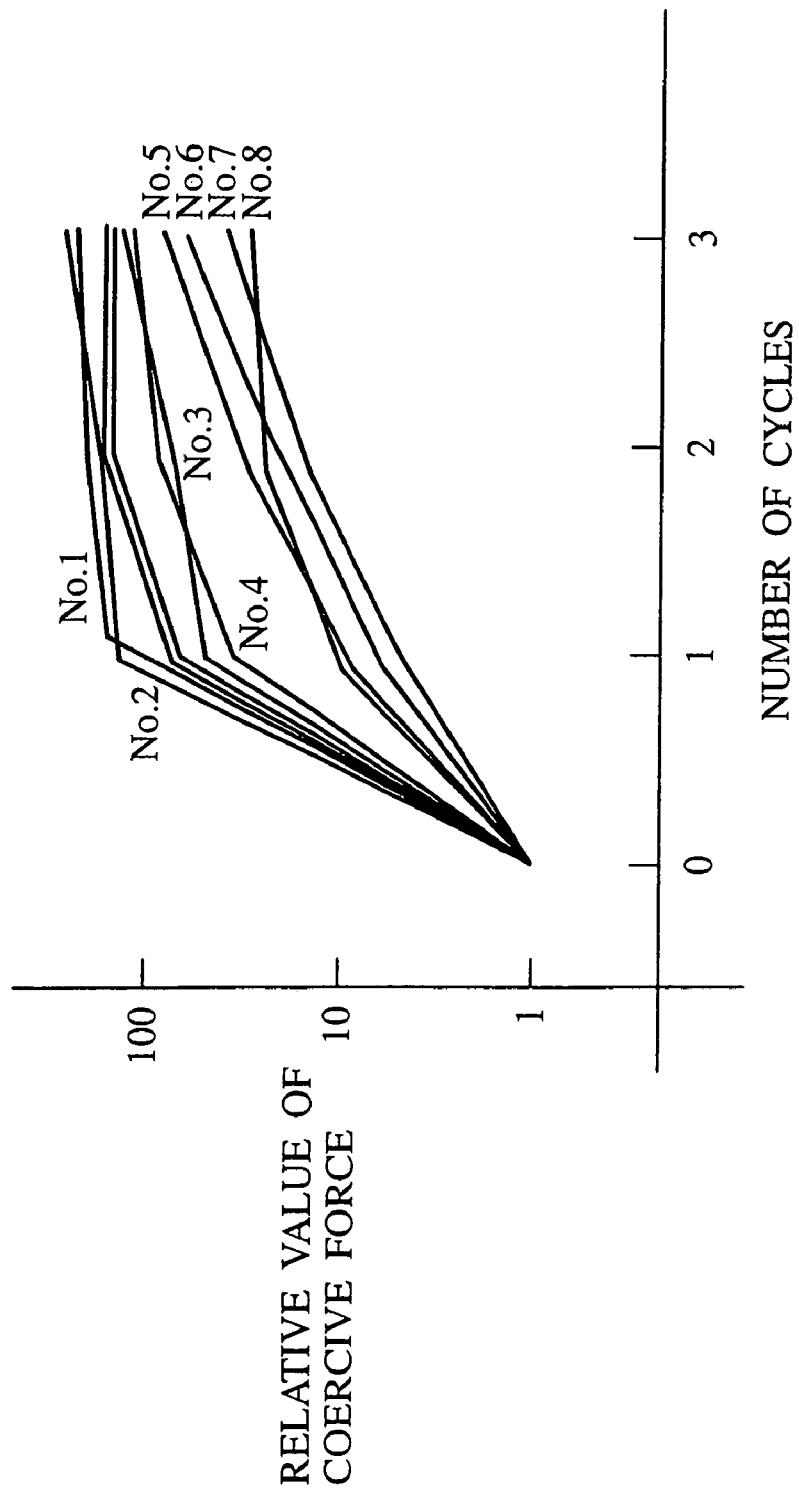
FIG. 2 is a graph showing relations between the numbers of process cycles and the relative values of coercive force, of materials shown in FIG. 14 of the first embodiment.

FIG. 2 shows the relative value of coercive force of the same material as in FIG. 1. It is apparent that coercive force is important as magnetic property can not be obtained in the form of mother material, and is improved by conducting amorphism and crystallization each once or more times.

Further, such increase in isotropy by repetition of the processes is the same also in an exchange spring magnetic powder combining various hard magnetic material phases with soft magnetic material phases as shown in FIG. 14, and data are described together in FIG. 2.

Figure 3:
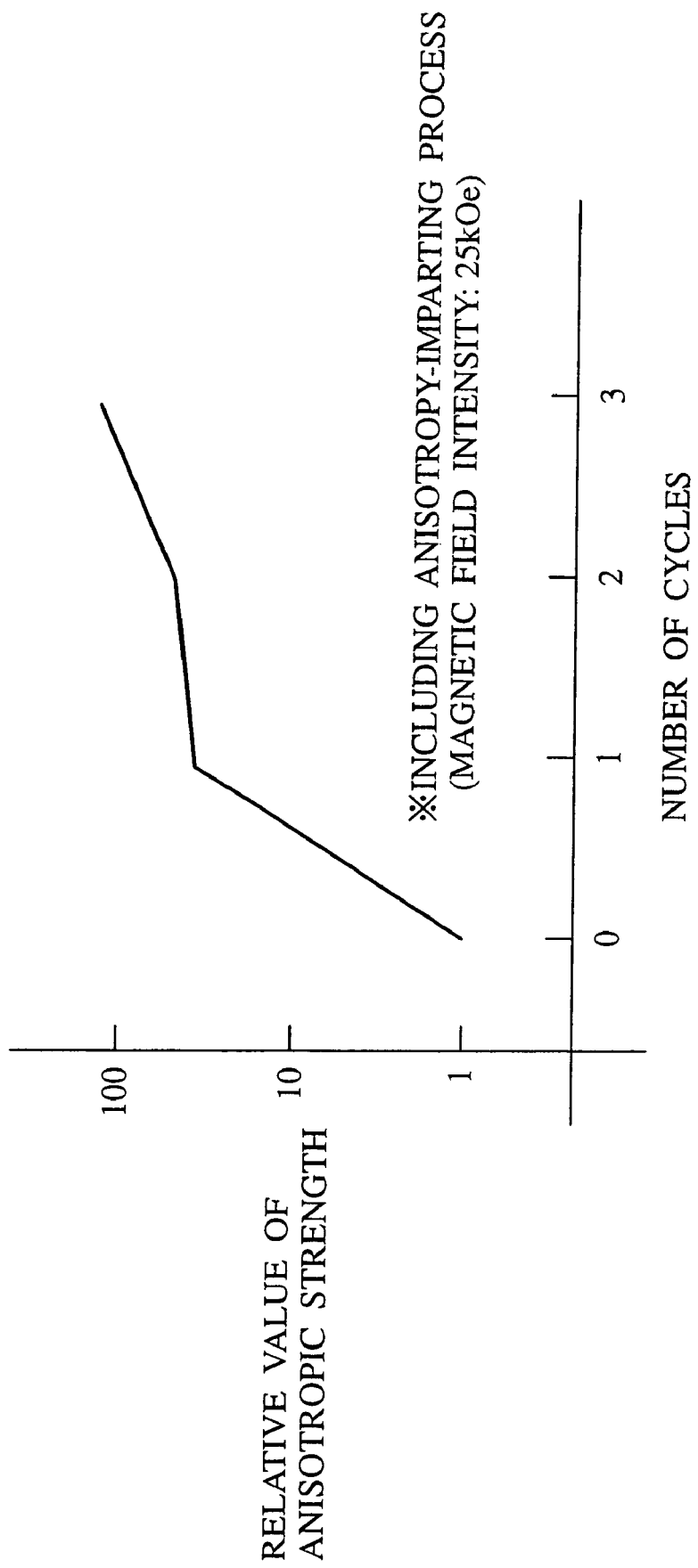
FIG. 3 is a graph showing a relation between the number of process cycles and the relative value of anisotropic strength in the first embodiment.

FIG. 3 shows the cycle number of amorphism and crystallization and the relative value of the anisotropic strength ($Br_{//}/Br_{\perp}$ ratio), when using a mother material having a composition in which x=20 and an amorphous content evaluated by temperature property of magnetization of 90%, the crystallizing process being a process in which compression molding is effected while imparting anisotropy in a magnetic field of 25 kOe(≈1990 kA/m), then, hot press is conducted in vacuum at a hot press compression pressure of 59 MPa (0.6 ton/cm²) and 650° C. for 10 minutes.

The effect of this process is extremely large, and it is known that anisotropy can be imparted by practicing once. Further, there is also shown a tendency of increase in extent of anisotropy by repetition of once or more times.

Figure 4:
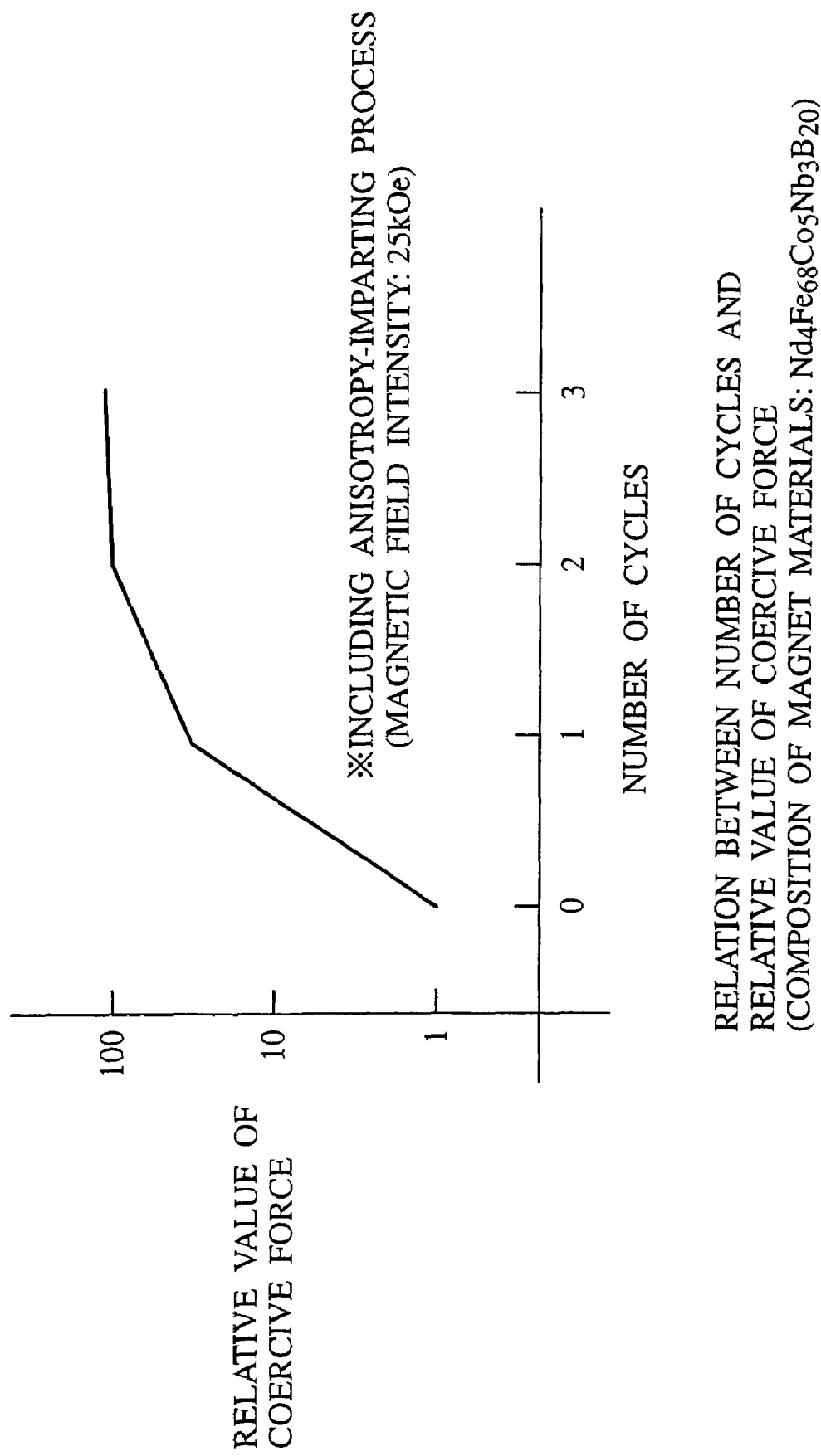
FIG. 4 is a graph showing a relation between the number of process cycles and the relative value of coercive force in the first embodiment.

FIG. 4 shows the relative value of coercive force of the same material as in FIG. 3. It is apparent that coercive force important as magnetic property can not be obtained in the form of mother material, and is improved by conducting amorphism and crystallization each once or more times.

Figure 5:
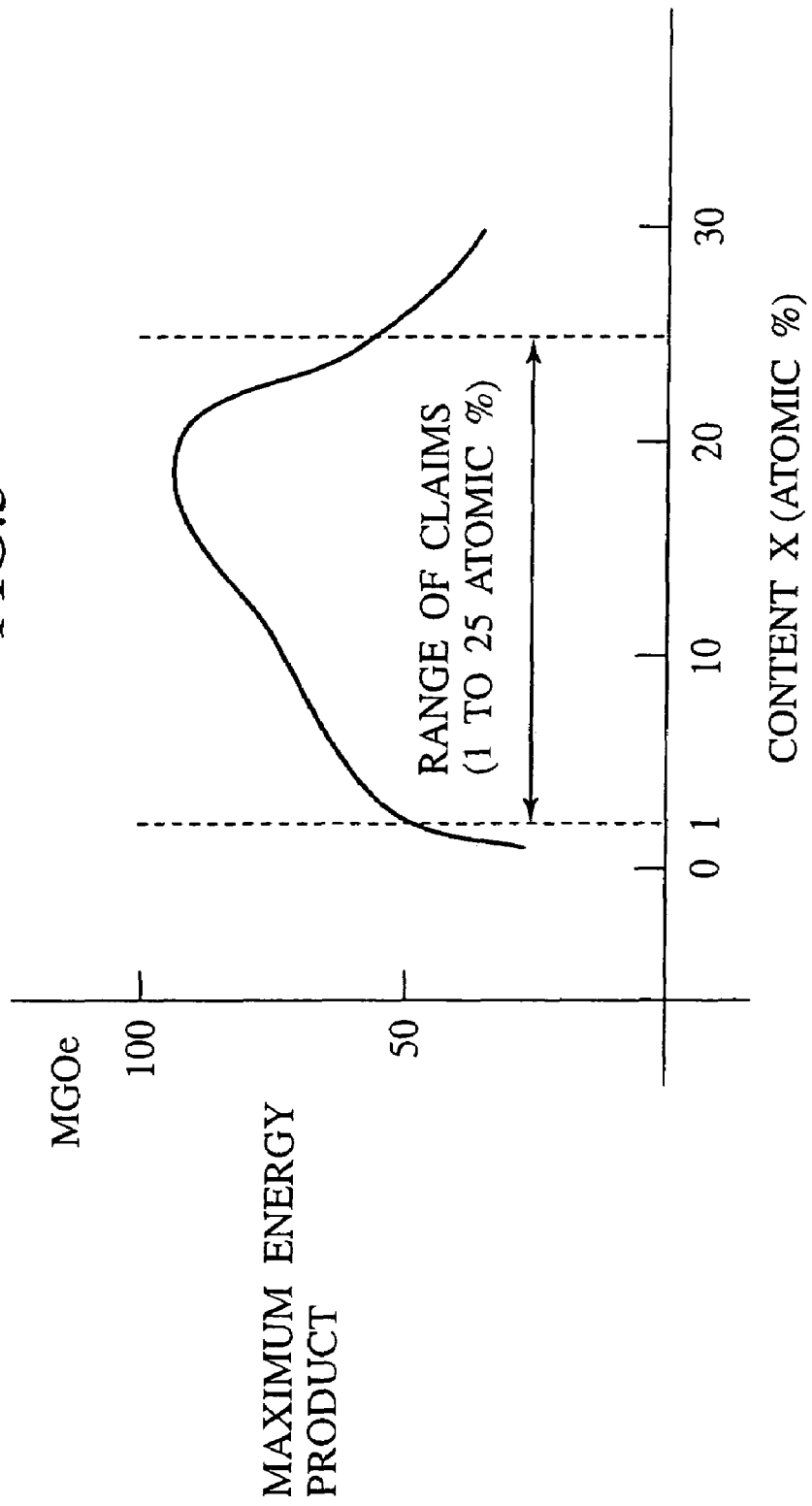
FIG. 5 is a graph showing a relation between the content x and the maximum energy product in the first embodiment.

FIG. 5 shows the maximum energy product of a compressed powder body, when evaluating a relation between x and the anisotropic strength, when using a mother material having a composition in which x=0.5 to 30 and an amorphous content evaluated by temperature property of magnetization of 75%, the crystallizing process being heat treatment in vacuum at 650° C. for 10 minutes, and the number of cycles of amorphism and crystallization being 3.

The maximum energy product of the compressed powder body, in this procedure was obtained from a magnetization curve along magnetic field application direction in producing the compressed powder body, and represents magnetic property of the powder. Regarding composition range, it is known that higher property over that of conventional magnetic materials is obtained when the amount of B is from 1 to 25 atomic %.

Figure 6:
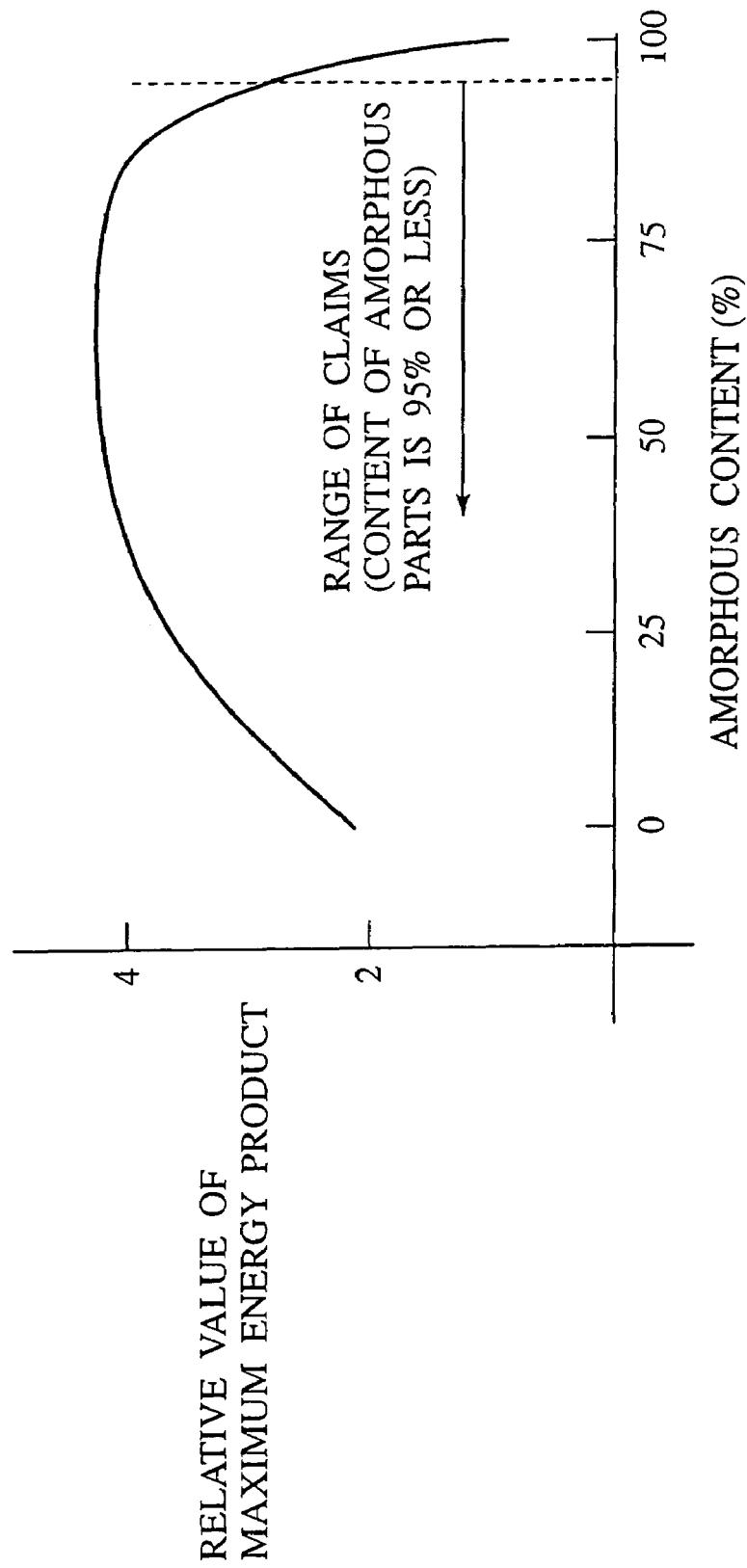
FIG. 6 is a graph showing a relation between the amorphous content and the relative value of maximum energy product in the first embodiment.

FIG. 6 shows the relative value of the maximum energy product of a compressed powder body, when evaluating the content of amorphous parts and the anisotropic strength, when using a mother material having a composition in which x=19, the crystallizing process being heat treatment in vacuum at 650° C. for 1 minute, and the number of cycles of crystallization being 3. The content of amorphous parts was evaluated by magnetization-temperature dependence of the mother material.

The cause of steep reduction in magnetic property when the content of amorphous parts is 90% or more is lowering of anisotropy. Further, it was proved that oxidation of materials could be reduced by inclusion of amorphous parts by quantitative evaluation of oxygen concentration.

Second Embodiment

A crytalline mother material containing amorphous parts was produced according to a liquid quenching method using an alloy of the formula: $Nd_xFe_{84-x}Co_8V_2B_6$ which had been subject to high frequency induction melting and casting, and this mother material was placed in a stainless steel ball mill pot together with stainless steel balls using cyclohexane as a solvent, and amorphising treatment was conducted according to a ball mill method.

Then, a crystallizing process was conducted for given cycles to obtain an anisotropic exchange spring magnet powder of this embodiment. In this magnetic powder, a hard magnetic material phase: $Nd_2Fe_{14}B$ had a crystal particle diameter of about 50 nm, and a soft magnetic material phase: Fe had a crystal particle diameter of about 50 nm.

The powder was ground into a powder of 100 μm or less, then, press-molded in a magnetic field of 25 kOe (1990 kA/m) to produce a compressed powder body, and magnetization curves along magnetic field application direction and vertical direction [to this] of the powder body were measured by a direct current BH tracer manifesting a maximum field of 25 kOe (1990 kA/m), and presence or absence of anisotropy was confirmed by a difference between these curves.

Figure 7:
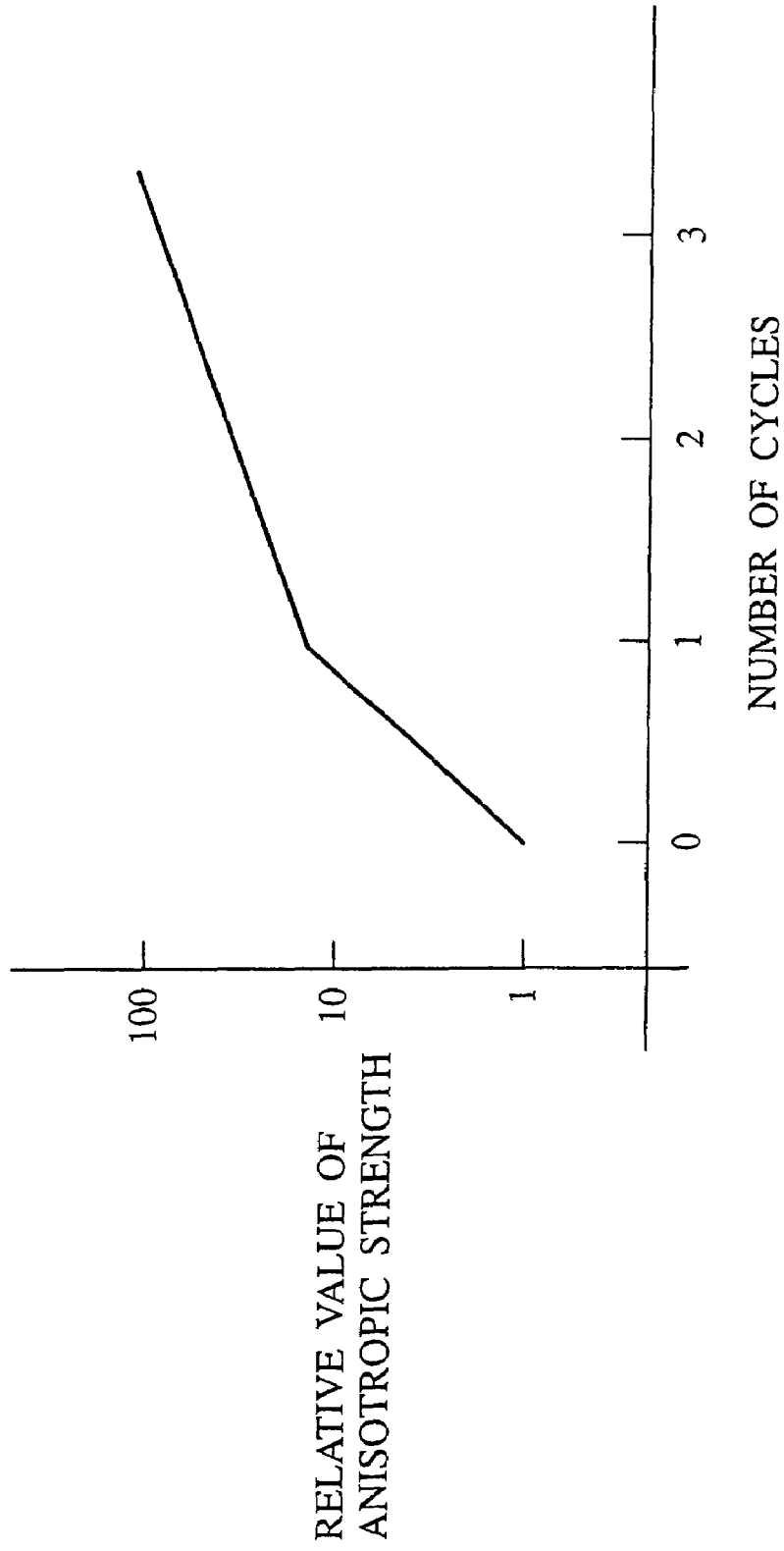
FIG. 7 is a graph showing a relation between the number of process cycles and the relative value of anisotropic strength in the second embodiment.

FIG. 7 shows the cycle number of amorphism and crystallization and the relative value of the anisotropic strength ($Br_{//}/Br_{\perp}$ ratio), when using a mother material having a composition of the above-mentioned alloy in which x=9 and an amorphous content evaluated by temperature property of magnetization of 50%, the crystallizing process being heat treatment in vacuum at 600° C. for 10 minutes.

It is known that the effect of the process of the present invention is extremely high, and anisotropy can be imparted by practicing once. Further, there is also shown a tendency for an increase of anisotropy by repetition of once or more times.

Figure 8:
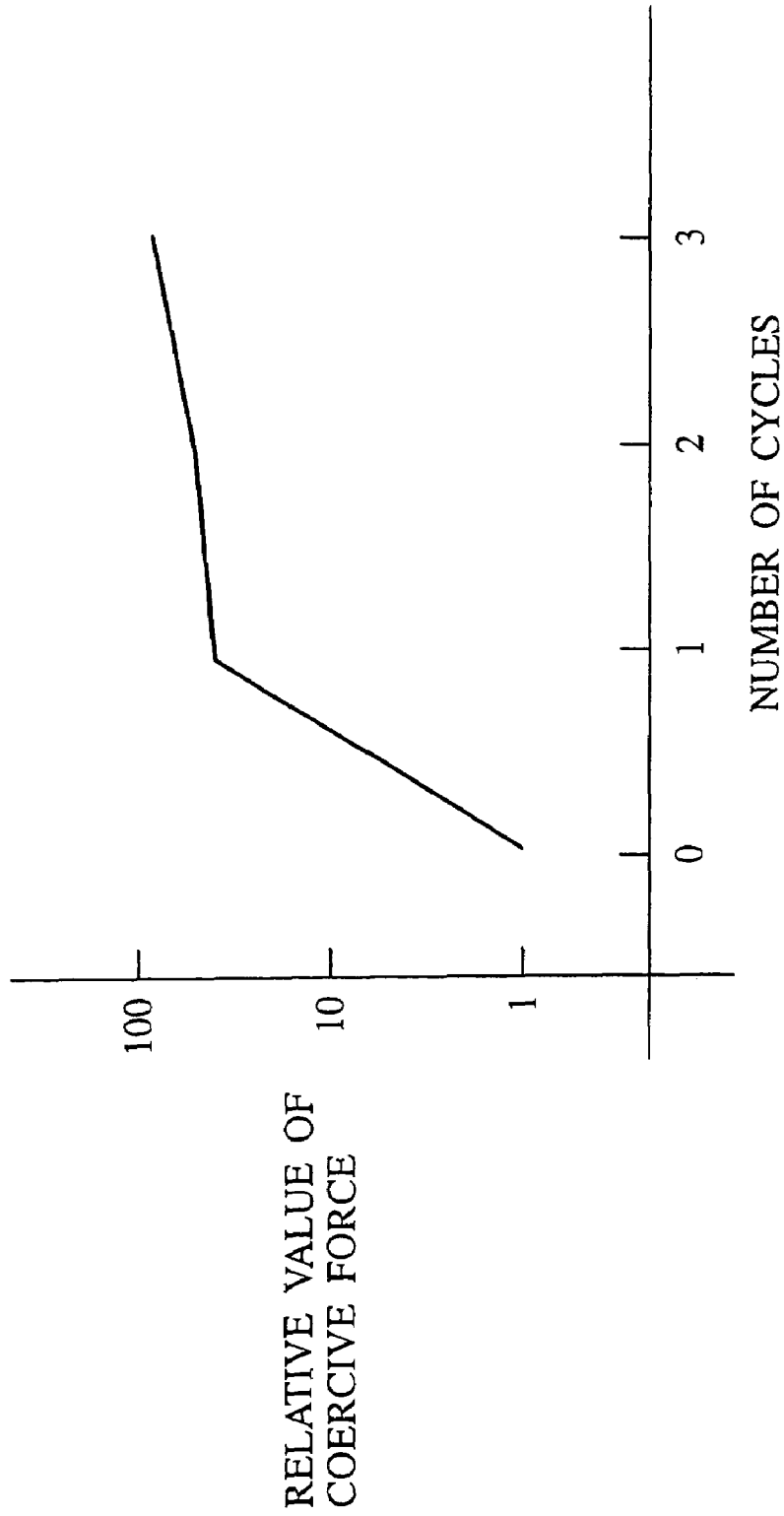
FIG. 8 is a graph showing a relation between the number of process cycles and the relative value of coercive force in the second embodiment.

FIG. 8 shows the relative value of coercive force of the same material as in FIG. 7.

It is apparent that coercive force is important as magnetic property can not be obtained in the form of mother material, and is improved by conducting amorphism and crystallization each once or more times.

Figure 9:
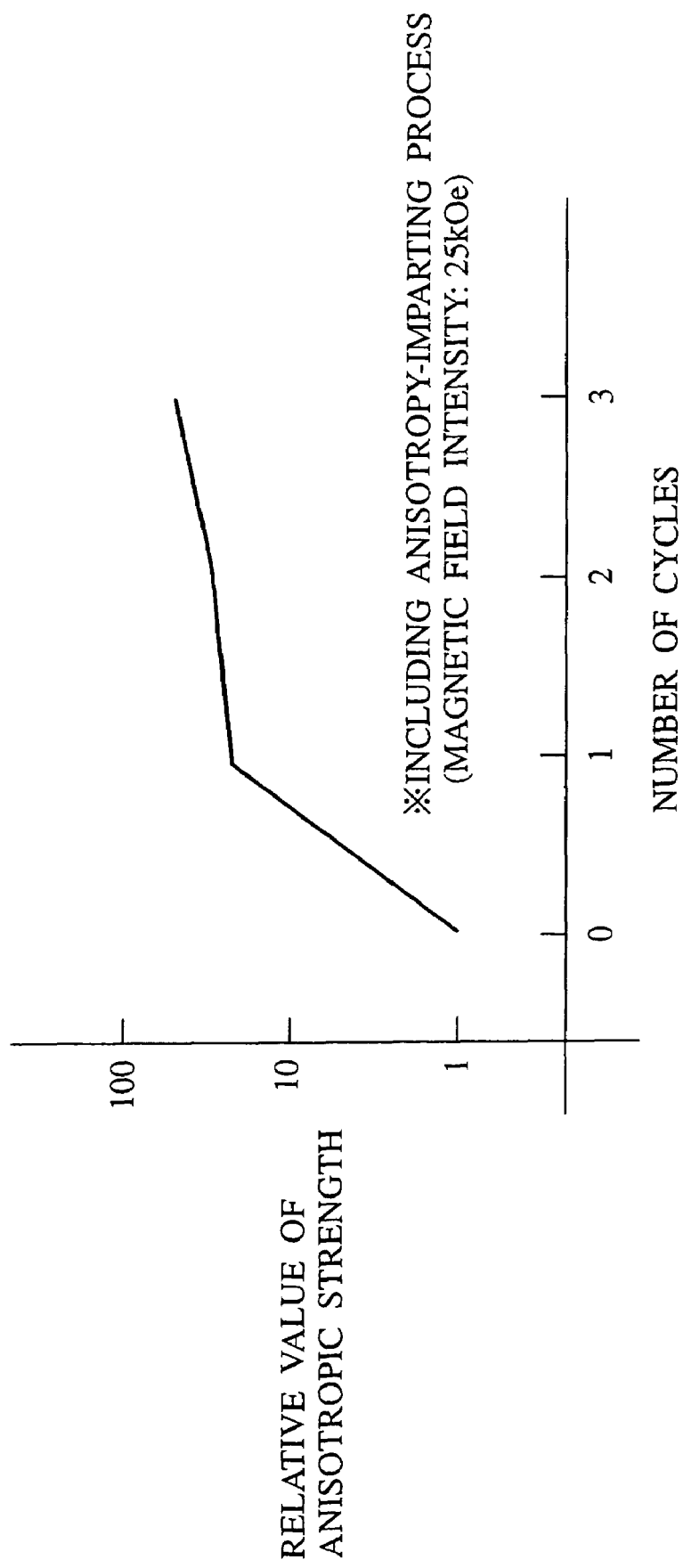
FIG. 9 is a graph showing a relation between the number of process cycles and the relative value of anisotropic strength in the second embodiment.

FIG. 9 shows the cycle number of amorphism and crystallization and the relative value of the anisotropic strength ($Br_{//}/Br_{\perp}$ ratio), when using a mother material having a composition in which x=8 and an amorphous content evaluated by temperature property of magnetization of 60%, the crystallizing process being a process in which compression molding is effected while imparting anisotropy in a magnetic field of 25 kOe(1990 kA/m), then, spark plasma sintering was conducted in vacuum at a compression pressure of 980 MPa (10 ton/cm$^2$) and 600° C. for 10 minutes.

The effect of this process is extremely large, and it is known that anisotropy can be imparted by practicing once. Further, there is also shown a tendency of an increase in anisotropy by repetition once or more times.

Figure 10:
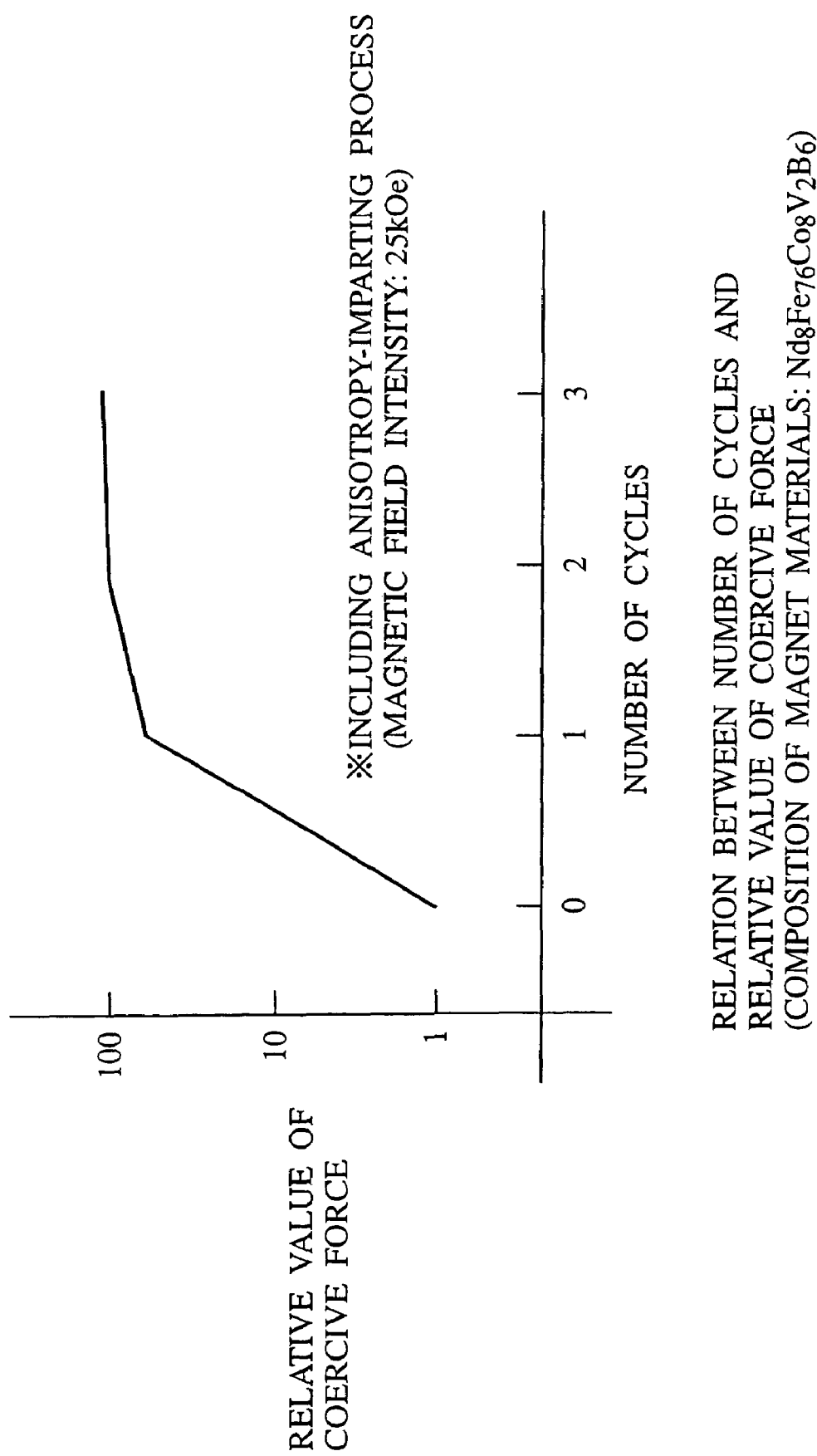
FIG. 10 is a graph showing a relation between the number of process cycles and the relative value of coercive force in the second embodiment.

FIG. 10 shows the relative value of coercive force of the same material as in FIG. 9.

It is apparent that coercive force is important as magnetic property can not be obtained in the form of mother material, and is improved by conducting amorphism and crystallization each once or more times.

Figure 11:
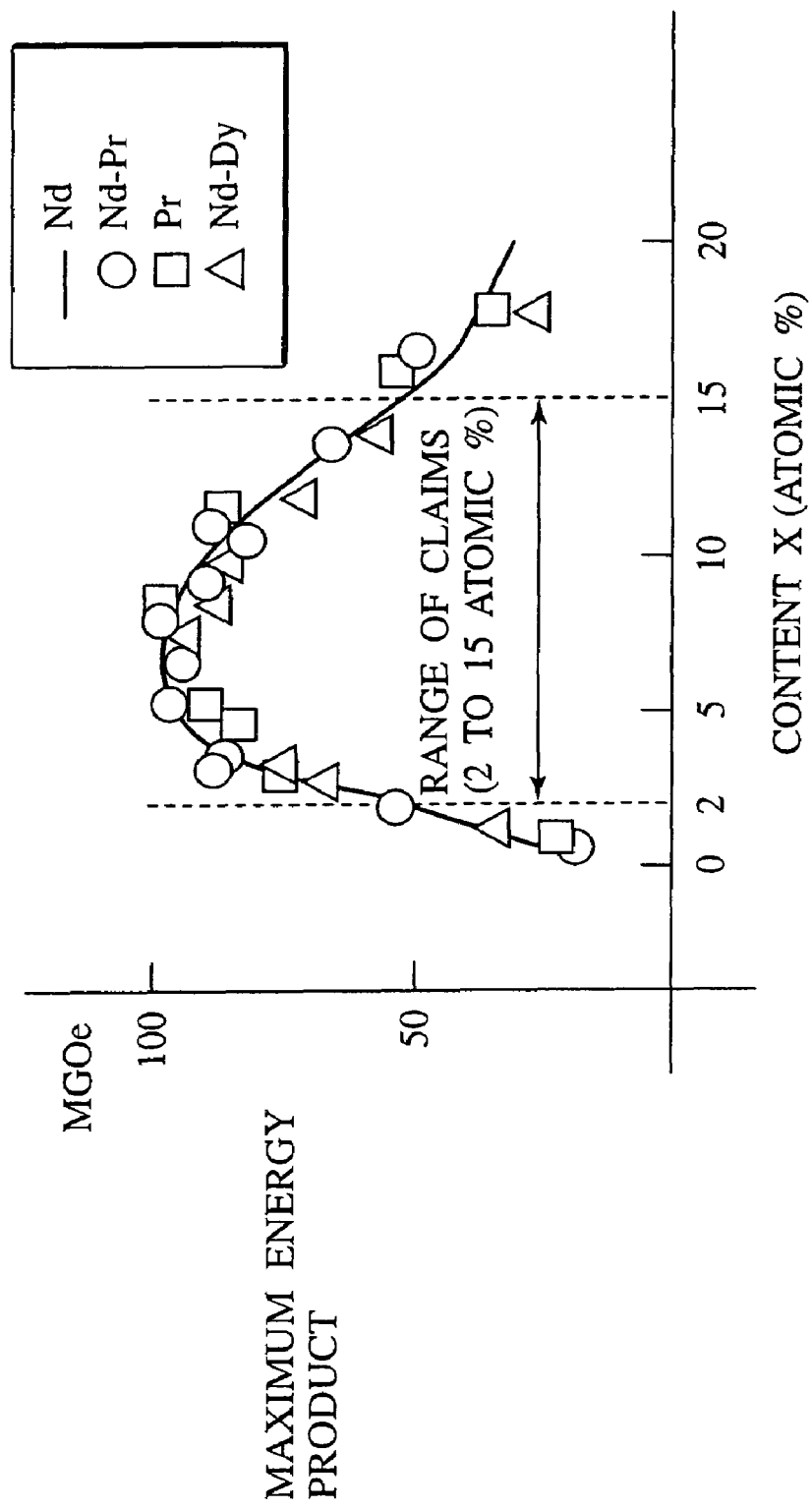
FIG. 11 is a graph showing a relation between the content x and the maximum energy product in the second embodiment.

FIG. 11 shows the maximum energy product of a compressed powder body, when evaluating a relation between x and the anisotropic strength, using a mother material having a composition in which x=0.5 to 20 and an amorphous content evaluated by temperature property of magnetization of 45%, the number of cycles of amorphism and crystallization being 2. The maximum energy product of the compressed powder body in this procedure was obtained from a magnetization curve along magnetic field application direction in producing the compressed powder body, and represents magnetic property of the powder.

Regarding composition range, it is known that higher property above that of conventional magnetic materials is obtained when the atomic % is from 2 to 15. Further, the same effect and high ability could be realized also when Nd—Pr, Pr, Nd—Dy (dysprosium) and the like were used as a rare earth metal element for a rare earth metal element Nd, and these data are illustrated together.

Figure 12:
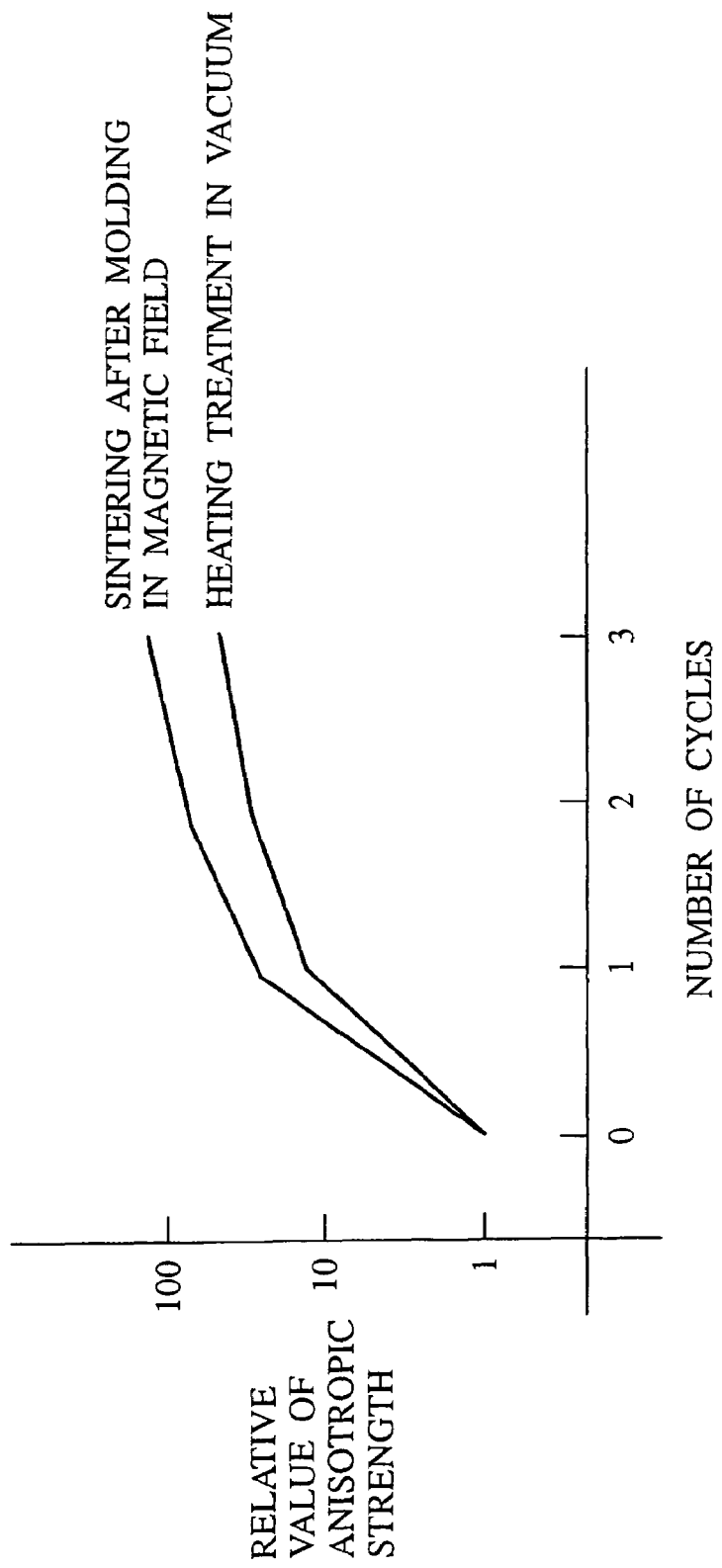
FIG. 12 is a graph showing relations between the numbers of process cycles and the relative values of anisotropic strength, when different crystallizing treatments are used, in the second embodiment.

FIG. 12 shows the number of cycles of amorphism and crystallization and the relative value of the anisotropic strength ($Br_{//}/Br_{\perp}$ ratio), when using a mother material having a composition in which x=7, and an amorphous content evaluated by temperature property of magnetization of 50%, the crystallizing process being "heat treatment in vacuum at 650° C. for 5 minutes" or "spark plasma sintering conducted in vacuum at 784 MPa (8 ton/cm$^2$) and 650° C. for 5 minutes, after compression-molding in magnetic field of 25 kOe(1990 kA/m)".

It is known that the extent of anisotropy further increases in a magnetic field when sintering is conducted after molding as compared with the case of heat treatment in vacuum as a crystallizing process.

Third Embodiment

Figure 13:
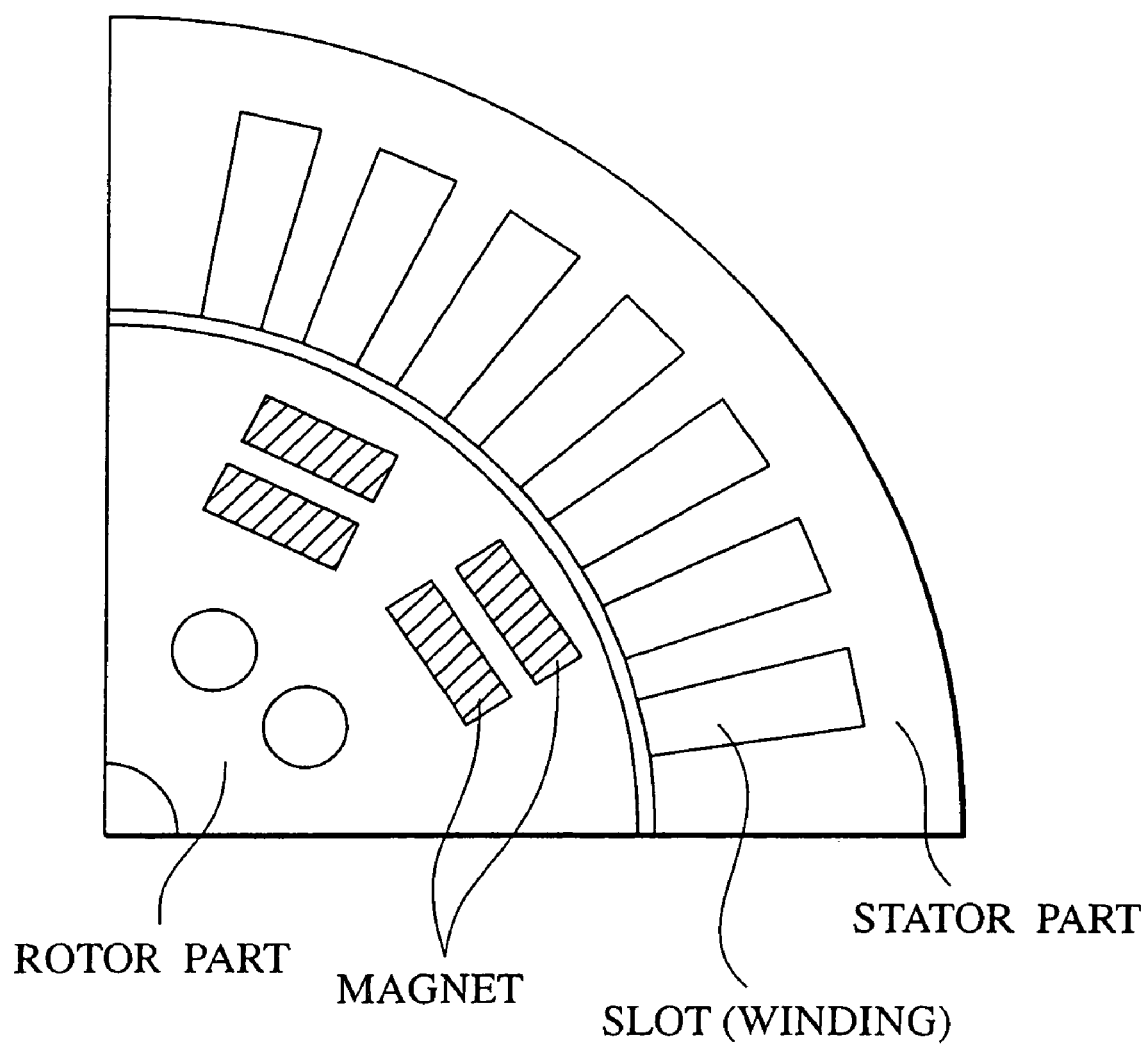
FIG. 13 is a schematic view showing the structure of a driving motor in the third embodiment.

FIG. 13 shows an embodiment in which a bulk spring magnet having an anisotropic effect was made using the anisotropic exchange spring magnet powder obtained in the second embodiment, and this was applied to a driving motor of an electric automobile or a hybrid electric automobile.

The maximum torque increased to 1.67-fold based on a motor using a conventional magnet.

As described above, according to the present invention, since a given crystalline mother material is treated in an amorphising process and a crystallizing process, an exchange spring magnet having excellent anisotropy and high maximum energy product can be realized. Namely, the production method of the present invention is a production method providing an anisotropic exchange spring magnet having excellent magnetic ability, and an anisotropic exchange spring magnet powder obtained from this magnet can realize a bond magnet and full dense magnet having high ability which have not been obtained from conventional isotropic magnetic powders, therefore, when the anisotropic exchange spring magnet of the present invention is applied to motors, magnetic sensors, rotation sensors, acceleration sensors, torque sensors and the like using magnets, production of smaller and lighter products is promoted, and when this magnet is applied to automobile parts, remarkable improvement in fuel consumption is possible.

Although the invention has been described above by reference to certain embodiments of the invention, the invention is not limited to the embodiments described above will occur to these skilled in the art, in light of the teachings. The scope of the invention is defined with reference to the following claims.

What is claimed is:

1. A method of producing an anisotropic exchange spring magnet powder comprising:
    preparing a crystalline mother material containing a hard magnetic material phase containing a rare earth metal element, a transition metal element, and at least one element selected from the group consisting of boron (B), carbon (C), nitrogen (N) and oxygen (O), and a soft magnetic material phase containing a transition metal element, and at least one element selected from the group consisting of boron (B), carbon (C), nitrogen (N) and oxygen (O), wherein the crystalline mother material partially having a content of amorphous parts of below about 95%;
    amorphising said crystalline mother material by a ball milling method, and
    crystallizing said crystalline mother material amorphisated in the amorphising process by heat treating.

2. The method of claim 1, further comprising: repeating a set of said amorphising process and crystallizing process, once or more times.

3. The method of claim 1, wherein a content of the rare earth metal element is within a range of 2 to 15 atomic % and a content of the at least one element selected from the group consisting of boron (B), carbon (C), nitrogen (N) and oxygen (O) is within a range of 1 to 25 atomic %.

4. The method of claim 1, wherein said crystallizing process further comprises: applying a anisotropic magnetic field to said crystalline mother material amorphisated in said amorphising process so as to impart anisotropy to said crystalline mother material amorphisated in said amorphising process.

5. The method of claim 1, wherein in said amorphising process, the ball mill method is conducted under a condition in which oxygen is blocked, in any of vacuum, an inert gas, nitrogen and an organic solvent.

6. The method of claim 1, wherein in said crystallizing process, the heat treating is conducted under a condition in which oxygen is blocked, in any of vacuum, an inert gas, nitrogen and an organic solvent.

7. The method of claim 1, wherein in said crystallizing process, the heat treating is conducted at a temperature of below about 950° C.

8. The method of claim 1, wherein in said crystallizing process, the heat treating is conducted for a time of 1 hour or less.

* * * * *